United States Patent
Fujieda

(10) Patent No.: US 7,352,901 B2
(45) Date of Patent: Apr. 1, 2008

(54) CONTOUR INSPECTION METHOD AND APPARATUS

(75) Inventor: Shiro Fujieda, Kyoto (JP)

(73) Assignee: OMRON Corporation, Kyoto (JP)

( * ) Notice: Subject to any disclaimer, the term of this patent is extended or adjusted under 35 U.S.C. 154(b) by 427 days.

(21) Appl. No.: 09/974,539

(22) Filed: Oct. 9, 2001

(65) Prior Publication Data

US 2002/0049560 A1   Apr. 25, 2002

(51) Int. Cl.
G06K 9/48    (2006.01)
G06K 9/40    (2006.01)

(52) U.S. Cl. ...................... 382/199; 382/266

(58) Field of Classification Search ........ 382/282–283, 382/260–269, 199
See application file for complete search history.

(56) References Cited

U.S. PATENT DOCUMENTS 5,805,221 A * 9/1998 Lee .................. 375/240.1
5,930,391 A * 7/1999 Kinjo .................. 382/173
6,278,494 B1 * 8/2001 Kanai et al. ............ 348/625
6,337,925 B1 * 1/2002 Cohen et al. ........... 382/199
6,343,158 B1 * 1/2002 Shiohara .............. 382/261
6,366,699 B1 * 4/2002 Kuwano et al. ......... 382/199
6,415,053 B1 * 7/2002 Norimatsu ............. 382/199

FOREIGN PATENT DOCUMENTS

DE   0788543   * 11/1996
EP   0996091   4/1999
JP   11-132743   5/1999

* cited by examiner

Primary Examiner—Brian Le
(74) Attorney, Agent, or Firm—Beyer Weaver LLP

(57) ABSTRACT

Defects in the contour of a target object is detected by obtaining an digital variable-density image of the contour and edges are extracted from the image of the contour so as to sequentially represent the contour. Their directions are measured and the direction of each edge is compared with those of other edges selected according to their distances from the edge under consideration. The differential is indicative of the presence or absence of an indentation or a protrusion in the contour, representing a defect.

9 Claims, 3 Drawing Sheets

CONTOUR INSPECTION METHOD AND APPARATUS

This application claims priority on Japanese patent application 2000-323187 filed Oct. 23, 2000.

BACKGROUND OF THE INVENTION

This invention is in the technical field of processing image data by using a computer and in particular for detecting defects in a target object being inspected by inspecting its contour where it should be smooth and have no protrusions or indentations.

According to a conventional method of detecting defects in the contour of a target object, an image area corresponding to the target object is initially extracted by a binary (dark-light or black-white) method and pixels forming a boundary line (contour line) between a white pixel area and a black pixel area are sequentially traced while comparing with the other pixels in the neighborhood. If the pattern of these mutually connected pixels forming a contour line is different from the intended contour pattern of the target object, it is determined that there is a defect.

Japanese Patent Publication Tokkai 11-132743 disclosed a technology of observing one of the pixels P1 forming a contour line when the intended contour pattern is smooth, selecting pixels P2 and P3 which are separated in mutually opposite directions by a same number of pixels from P1 and detecting a defect if the angle made between line segment P1-P2 and line segment P1-P3 is greater than a specified value. The pixel to be observed is one on the contour line and the neighboring pixels are selected one after another.

Since errors associated with quantization do occur, patterns extracted from a binary image include small indentations and protrusions with the size of one pixel or several pixels in most situations even if the contour of the target object has no defects. It is therefore extremely difficult to detect a defect of such a small size by a method based on the connected pattern of the pixels which form a contour. In fact, defects which are smaller than a few pixels cannot be detected by the technology of Japanese Patent Publication Tokkai 11-132743, as can be understood because two pixels mutually separated by more than several pixels are selected according to this technology and treat the line segment connecting these two pixels as the smallest unit of the contour line. In the case of a defect on a gently curving line or a relatively wide defect with a smaller depth or height, furthermore, the angle between the line segments tends to remain large no matter how the interval between the pixels to be selected is set. Thus, it is difficult to detect a defect with high sensitivity in such a situation. Moreover, the process of selecting two pixels from an initially selected pixel on the contour line separated by a specified number of pixels and determining line segments connecting them and the angle between them must be repeated sequentially along the contour line. The calculations are cumbersome and frustrate the effort to speed up the process.

SUMMARY OF THE INVENTION

It is an object of this invention to provide a method and apparatus for dependably detecting small defects on a contour smaller than several pixels.

It is another object of this invention to provide a method and apparatus for detecting with a high level of sensitivity even defects on a gently curving contour line or defects which are relatively wide and of a relatively small depth or height.

It is a further object of this invention to provide a method and apparatus for detecting defects in a contour line at a high speed.

When the contour of a target object is a straight line or an smoothly turning curve such as a circular arc, the direction of density gradient within a range of several pixels along the contour is nearly constant. If the contour line has a defect in the form of a protrusion or an indentation, however, the direction of the density gradient at a pixel on the contour line becomes different from that of the density gradient where there is no defect at the same place. The present invention is based on this principle. According to this invention, pixels forming the contour of a target object on an image obtained by photographing it (referred to as the edge pixels) are identified and the "direction" of each edge pixel is measured, the direction of an edge pixel is defined as the direction of the density gradient (or a direction which makes a specified angle such as 90° with the direction of the density gradient) on the image at that edge pixel. While specified edge pixels are sequentially selected, the direction of each selected edge pixel is compared with the direction of another edge pixel separated from the selected edge pixel by a specified distance, presence or absence of a defect on the contour line being determined from the result of such comparisons.

Any of many known methods may be used to identify edge pixels. According to one of such known methods, an image is represented by pixels with two values (dark and light or white and black) and a contour line is identified on such an image. Alternatively, an edge extraction filter may be used to obtain the "edge intensity" (or the density differential) at each pixel and to select those pixels where the edge intensity is a maximum in at least one direction compared to the neighboring pixels. According to still another method, those pixels with edge intensity values greater than a specified value are picked to form an image of a contour with a width of several pixels and a thinning process is carried out to obtain a line with the width of one pixel.

In the process of comparing the directions of edge pixels, it is desirable to use those of the edge pixels of which the directions are not abruptly changing as reference edge pixels. A plurality of reference edge pixels separated from the edge pixel under consideration may be selected sequentially or periodically.

By a comparison method as described above, no significant difference between each edge pixel and its reference edge pixels will be observed unless there is defect such as an indentation or a protrusion. If there is a defect on the contour of the target object, on the other hand, significant differences will be observed when the directions of the edge pixels at the defective portion of the contour of the target object are compared with the directions of their reference edge pixels. Thus, a defect can be detected from an observed large difference in the directions of edge pixels.

According to this invention, even if the pattern of a contour line may include small indentations or protrusions while the target object has no defective contour, the directions of edge pixels forming such small indentations and protrusions do not vary significantly at these edge pixels. Thus, there is no likelihood of erroneously concluding that the target object is defective. If the target object has a defective part, on the other hand, such a defective part can be dependably detected because the direction of the density gradient changes abruptly at such a defective part.

Even if the defect on the contour line is a gentle curve or is relatively wide and has a small depth or height, a relatively large change usually takes place in the direction of the density gradient between edge pixels forming the defect. Thus, defects of this kind can also be detected with a high level of sensitivity according to this invention.

Another advantage of this invention is that presence and absence of defects can be examined rapidly because the determination is made by comparing the directions of edge pixels, not requiring the cumbersome processes of calculating the directions of many line segments connecting two points such as according to a prior art technology.

According to a preferred embodiment of this invention, directions of edge pixels are compared by considering the direction of one edge pixel and comparing it with the direction of another edge pixel at a specified distance. Throughout herein, the expression "distance" in this context is intended to be understood as an indicator of the separation between the two edge pixels and may be expressed in terms of the number of pixels in between. Moreover, this "specified distance" may be a quantity selected and inputted by the user. When a plurality of edge pixels are considered for comparison, furthermore, the region from where these edge pixels are to be extracted, the number of edge pixels to be extracted and how intermittently these edge pixels should be extracted may be determined by the user, depending on the desired inspection sensitivity.

According to another preferred embodiment of the invention, edge extraction filters with different mask sizes are prepared and one selected therefrom, depending on the desired sensitivity of the inspection, may be used for the extraction of edge pixels.

DETAILED DESCRIPTION OF THE INVENTION

Figure 1:
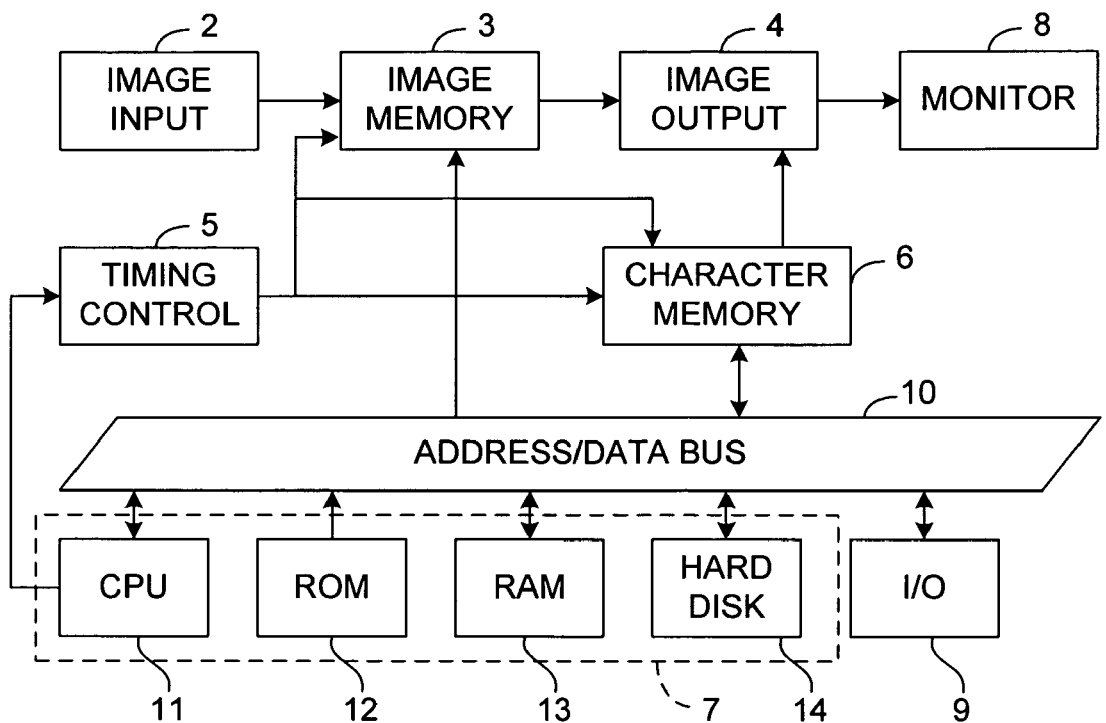
FIG. 1 is a block diagram of a contour inspection apparatus embodying this invention.

FIG. 1 shows the structure of a contour inspection apparatus 1 embodying this invention. This apparatus is for inspecting a digital variable-density picture image (herein simply referred to as the image) to detect a defect in the contour of a target object on the image and is composed of an image input device 2, an image memory 3, an image output device 4, a timing control unit 5, a character memory 6, a control unit 7, a monitor 8 and an I/O port 9.

The image input device 2 is composed of an interface circuit for receiving variable-density image signals from an analog camera (not shown), and A/D converter for converting the aforementioned image signal and a filter circuit for cutting off noise. The use of an analog camera is not intended to limit the scope of the invention. A digital camera may be used instead.

The image memory 3 is for receiving and storing the digital variable-density image data received by the image input device 2. The character memory 6 is for storing text data for displaying character data such as the result of inspection as well as the positions of displays. Each of these memory devices 3 and 6 is connected to the control unit 7 through an address/data bus 10 and serves to output data requested by the control unit 7 to the image output device 4 or to the address/data bus 10 according to a timing signal outputted from the timing control unit 5.

The control unit 7 is mainly composed of a CPU 11, a ROM 12 and a RAM 13 and is also provided with a hard disk 14 with a control program installed thereon for showing an inspection procedure. The CPU 11 serves to carry out a desired measurement process by reading from and writing in the memory devices 3 and 6 through the address/data bus 10 on the basis of the control program on the hard disk 14.

The image output device 4 serves not only to transmit image data on a target object being inspected to the monitor 8 but also to transmit, when a series of inspections has been completed, character data for showing the result of the inspections either by themselves or in a synthesized form as an image on a screen. The I/O port 9 is connected to an input device such as a keyboard and a mouse and an output device such as an external memory device and transmitting means and serves to input various data from the input device and to output the results of inspections to the output device.

The contour inspection apparatus 1 thus structured serves firstly to identify (or extract) edge pixels which represent the contour of a target object on the image inputted to the image memory 3 and to measure the directions of the extracted edge pixels. While the extracted edge pixels are followed sequentially, presence or absence of a defect is determined by comparing the measured directions of the edge pixels.

Figure 2:
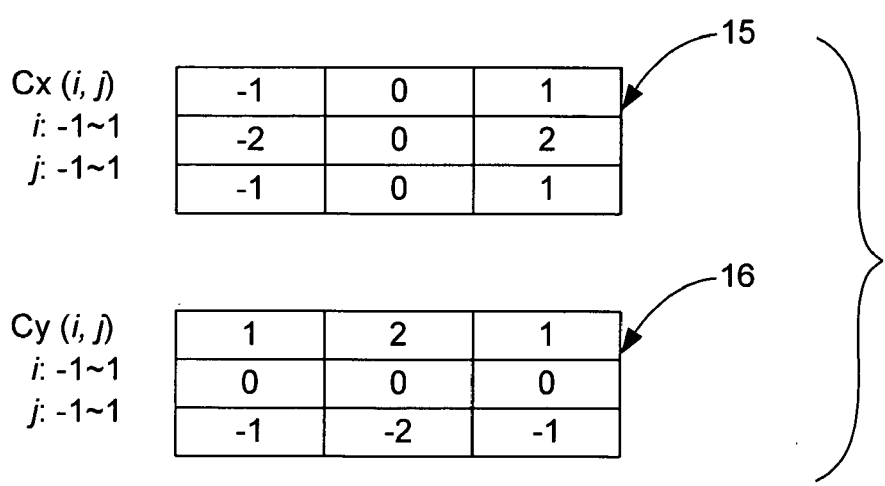
FIG. 2 is a diagram for showing the structure of a filter used in the edge extraction process according to this invention.

In the process for extracting edge pixels, an edge extraction filter as shown in FIG. 2 is used on an image. FIG. 2 shows an example of a Sobel filter with a 3×3 mask, including a filter 15 for extracting density (darkness) gradient in an x-direction $Ex(x,y)$ and another filter 16 for extracting density gradient in an y-direction $Ey(x,y)$. These filters 15 and 16 are scanned on the image and coefficients $Cx(i,j)$ and $Cy(i,j)$ in the mask and the density value $F(x,y)$ of each pixel at each scanned position are used to calculate the density gradients $Ex(x,y)$ and $Ey(x,y)$ corresponding to the pixel at the center of the mask. The formulas for this calculation are given as follows:

$$Ex(x,y)=\Sigma_i\Sigma_j\{Cx(i,j)F(x+i,y+j)\}$$

$$Ey(x,y)=\Sigma_i\Sigma_j\{Cy(i,j)F(x+i,y+j)\}$$

These density gradients $Ex(x,y)$ and $Ey(x,y)$ show the changes in the density (darkness) respectively in the x-direction and the y-direction between the two regions at the boundary between which is the pixel under consideration. The direction of the density gradient (in which the density changes across the pixel under consideration) and the magnitude of the gradient (hereinafter referred to as the "edge intensity") are shown in terms of the vector synthesized from the density gradients $Ex(x,y)$ and $Ey(x,y)$ thus calculated. The density intensity $Ei(x,y)$ at position $(x,y)$ is defined as follows:

$$Ei(x,y)=(\{Ex(x,y)\}^2+\{Ey(x,y)\}^2)^{1/2}.$$

Where a high-speed calculation is desired, a simpler formula given below may be used instead to define the density intensity:

$$Ei(x,y)=Ex(x,y)+Ey(x,y).$$

According to the example being described, the mask is scanned to carry out the edge extraction procedure by means of a software process, as will be explained more in detail below, but this is not intended to limit the scope of the invention. A dedicated differential circuit may be used to carry out the edge extraction parallel with the image input into the image memory 3, the subsequent processes being carried out by using the generated edge image. The edge extraction filter need not comprise a 3×3 mask. A filter with a plurality of masks with different sizes may be set such that a proper filter can be selected, as will be described more in detail below, according to the conditions of the inspection.

Figure 3:
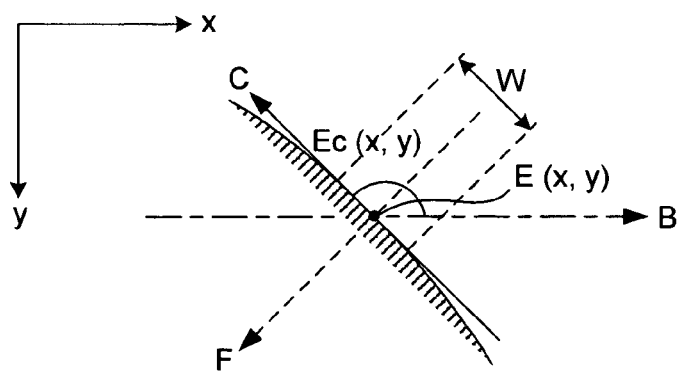
FIG. 3 is a drawing for showing the direction of density gradient and the direction of an edge pixel.

FIG. 3 is referenced next to explain the relationship between the direction of density gradient and the direction of an edge pixel.

In this example, the direction from an area where the density is higher to another area where the density is lower is defined as the direction of the density gradient. FIG. 3 shows a portion of a contour of a target object where the density of the target object is smaller than that of the background (that is, where the target object is darker than the background). Letter E indicates an edge pixel on the contour of the target object and letter F indicates a vector which points in the direction of the density gradient at the edge pixel E.

The direction of the edge pixel E is defined as the direction perpendicular to vector F (and indicated as vector C in FIG. 3). The direction $Ec(x,y)$ of Vector C is expressed by the angle measured in the counter-clockwise direction from the positive direction of the x-axis (indicated by Vector B). Hereinafter $Ec(x,y)$ is referred to as the "edge code".

Since Vector F is a vector having the density gradients $Ex(x,y)$ and $Ey(x,y)$ as its x-component and y-component and Vector C is perpendicular to Vector F, the edge code $Ec(x,y)$ can be obtained by one of the following formulas:

$Ec(x,y)=a\tan\{Ey(x,y)/Ex(x,y)\}$ if $Ex(x,y)>0$ and $Ey(x,y)\geq 0$;

$Ec(x,y)=360°+\mathrm{atan}\{Ey(x,y)/Ex(x,y)\}$ if $Ex(x,y)>0$ and $Ey(x,y)<0$;

$Ec(x,y)=180°+\mathrm{atan}\{Ey(x,y)/Ex(x,y)\}$ if $Ex(x,y)<0$;

$Ec(x,y)=0°$ if $Ex(x,y)=0$ and $Ey(x,y)>0$; and $Ec(x,y)=180°$ if $Ex(x,y)=0$ and $Ey(x,y)<0$.

If the contour of the target object is smooth as shown in FIG. 3 without indentations or protrusions, the directions of the edge pixels E over a small region with width W is more or less uniform. In other words, the difference between the edge codes of edge pixels included within the same width W is nearly equal to zero. The magnitude of W may be variable, depending on the contour of the target object. If the contour is straight or a gentle curve, the value of W may be large but if it is a curve with a sharply changing slope, the value of W is made smaller.

If a portion of the contour of the target object is defective, containing an indentation or a protrusion, the directions of edge pixels at such a defective portion become different from what they would be if there were no defects. Accordingly, the edge codes in this portion become significantly different from those of edge pixels elsewhere.

Figure 4:
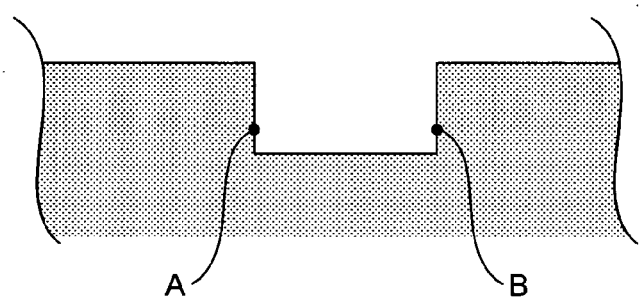
FIG. 4 is a drawing for showing a situation where the difference between the directions of edge pixels is the largest.

The difference between the edge codes of two edge pixels is the largest, when they are facing in the opposite directions as shown by edge pixels A and B in FIG. 4. In this example, the difference between the edge codes of edge pixels A and B is 180°. The difference between two edge codes is always between 0° and 180°.

Figure 5:
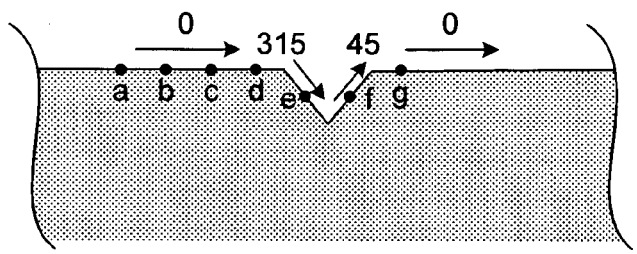
FIG. 5 is a drawing for showing the principle by which a defect is detected according to a method embodying this invention on the basis of differences in edge codes.

The principle of this invention for detecting a defect from the differentials of edge codes is explained next with reference to FIG. 5 which shows an example of a portion of an image of a target object. Letters a-g in FIG. 5 show edge pixels extracted at freely selected positions on the contour of the target object. Edge pixels a, b, c, d and g are at positions of a normal portion of the contour line but edge pixels e and f are at positions of an indentation formed on the contour such that the edge codes of edge pixels e and f are respectively 315° and 45°. If edge code differentials are calculated in the order of their positions, they are 0° among throughout edge pixels a-d but the differential between edge pixels d and e is 45°, that between edge pixels e and f is 90° and that between edge pixels f and g is 45°.

In this example, edge pixels are considered in the order in which they are extracted along the contour line in the image and the edge code differentials are calculated for each of the extracted edge pixels with those which are separated therefrom along the contour by a specified distance. If the differential at any of the edge pixels is greater than a certain threshold value, it is concluded that there is a defect in the contour of the target object at the position of such an edge pixel.

A routine for detecting a defect by the CPU 11 is explained next in detail with reference to the flowchart of FIG. 6 for a situation when the normal contour (without a defect) would be circular or elliptical such that the direction of the edge pixels selected on its contour would change gently. If this routine is to be applied to a target object normally including a sharp corner (say, by being rectangular) such that the direction of the edge pixel is normally expected to change abruptly, the routine is applied separately for each portion of the contour not including such a corner. Over portions of the contour line where the direction of the edge pixel is expected to change suddenly, either the criterion for finding a defect should be changed or another method of inspection must be used.

Figure 6:
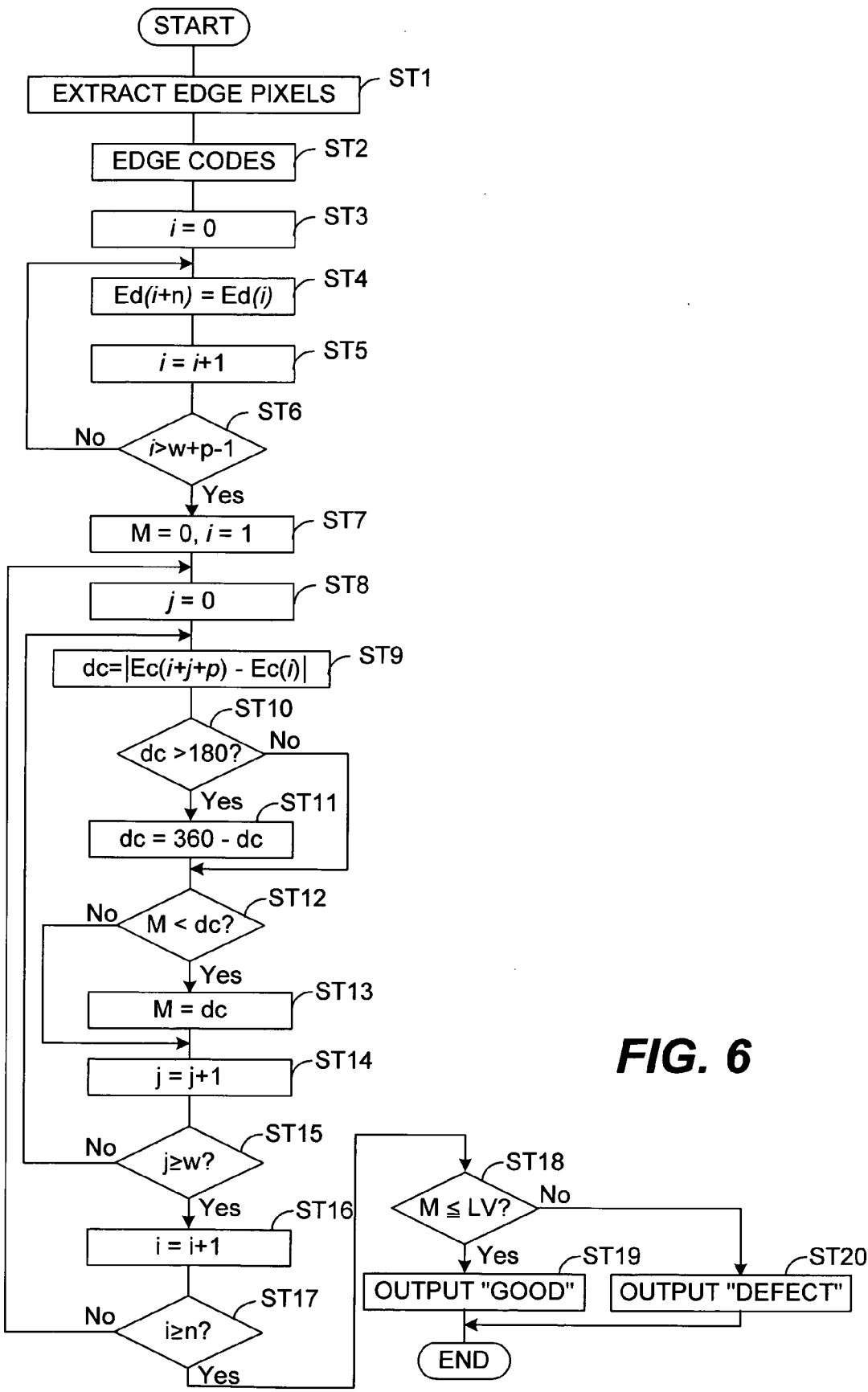
FIG. 6 is a flowchart of an inspection procedure embodying this invention.

According to the method illustrated in FIG. 6, an edge filter as described above is used to obtain edge intensity of each pixel and those found to have an edge intensity greater than a specified value are extracted. By this process, a contour line for the target object will appear on the image but a contour line thus obtained usually has a width of several pixels. Next, the edge intensity of each of these extracted pixels is compared with that of neighboring pixels and those having a maximum edge intensity along any straight line which passes through it are identified or further extracted as an edge pixel (Step ST1).

Next, edge codes are calculated from the density slopes $Ex(x,y)$ and $Ey(x,y)$ of these edge pixels (Step ST2). Although not shown in the flowchart, the coordinates and the edge code of each edge are preliminarily sorted in the order along the contour by referencing model data according to a given standard contour shape and stored in the RAM 13. In the description below, n indicates the number of stored data, and i and j are counters (dummy indices) for edges. In addition, two parameters w and p which are natural numbers are used for indicating the range of comparison. Explained more in detail, when comparisons are made between edge codes of one edge pixel and one of its neighbors, the comparisons will start with the pth edge pixel from the one under consideration to the (p+w)th edge pixel. In other words, this defines the "comparison range".

If p is very small (say, p=1 or 2), a comparison may be made between two edge pixels which are very close together such that the masks of edge extraction filters at their centers may be overlapped with each other and their edge codes may be calculated by using in part the same group of edge pixels in between. Thus, it is not likely that any significant difference will be observed in the edge codes of these pixels. It is therefore preferable to set p equal to a somewhat larger value such as 3 or 4.

The sum p+w will indicate pixels at up to what maximum distance should be included for a comparison. Sudden changes in the edge codes along a contour line around a target object can be detected whether the value of p+w is large or small. A gentle curving of the contour line, however, is not detectable unless the value of p+w is sufficiently large, corresponding to a distance large enough to produce a change in the edge code. This value indicates how steep the change in the edge code along the contour should be regarded as an indication of a defect and may be determined automatically or by the user according to results of measurements on model data.

In practice, the value of p may be fixed while that of w is varied or both p and w may be made variable. When p and w are both made variable, if the value of p+w is kept constant and w is made smaller (to make p larger), the number of comparisons to be made becomes smaller and hence the measurement process can be sped up. If w is made larger while p is made smaller, on the other hand, the accuracy of the measurement is improved.

In Steps ST3-ST6, the counter i is used to copy the edge codes Ec(i) of the first (p+w) edge pixels (counting from the foremost edge pixel) as data for the nth edge pixel and the edge pixels that come thereafter. These copied edge codes are used later (in Step ST9) for calculating the density differentials for the final w edge pixels. Next, a parameter hereinafter referred to as the "defect parameter M" is set to 0 as its initial value and counter i is reset to 0 (Step ST7).

Next, counter j is set to 0 (Step ST8) and the absolute value (dc) of the differential between the edge code Ec(0) of the aforementioned foremost edge pixel and the edge code Ec(p) of the pth edge pixel (Step ST9). If this differential value dc is greater than 180° (YES in Step ST10), this is replaced by 360°-dc (Step ST11).

Next, the differential value dc is compared with the defect parameter M (Step ST12). If dc is greater than M, the defect parameter M is replaced by the differential value dc (Step ST13). This procedure is repeated until counter j is increased sequentially and reaches w (Steps ST14 and ST15). During this loop routine (Steps ST9-ST15), the w edge pixels starting from the pth edge pixels counted from the foremost edge pixel are considered sequentially, and the largest of their differential values is set equal to M.

Next, counter i is sequentially increased until n (Steps ST16 and ST17) to repeat the loop consisting of Steps ST8-ST15. At the end of this loop, the largest of the differentials dc obtained within the range of p+w is set as the defect parameter M and this value is finally compared with a threshold value LV (Step ST18). If M is smaller than the threshold value LV, a signal ("Good") that the contour of the target object is free of defects is outputted to the monitor 8, as well as to external apparatus (Step ST19). If M is greater than the threshold value LV, another signal ("Defect") that the contour of the target object is not free of defects is outputted (Step ST20). The program may be set such that the differential value dc and the coordinates of the position at which the differential value dc exceeded the threshold value LV are also outputted.

The sensitivity of inspection can be adjusted by properly selecting the value of w, as explained above. It can be adjusted also by way of the edge extraction filter. If a filter with a small mask is used, even a small density gradient can be detected and it becomes easier to detect even smaller defects because difference in edge code between edge pixels becomes observable more easily. If a filter with a larger mask is used, on the other hand, small differences in the density gradient are ignored and smaller defects cannot be detected because the difference in edge code between edge pixels also becomes small.

It is also possible to adjust the inspection sensitivity by increasing counter j not by 1 as shown in Step ST14 of FIG. 6 but by a larger number.

What is claimed is:

1. A method of inspecting a contour of a target object, said method comprising the steps of:

preparing a variable-density image of said contour;

extracting edge pixels along and from said contour on said image;

measuring directions of said edge pixels, the direction of each of said edge pixels being defined as a direction that makes a specified angle with the direction of the density gradient on said variable-density image at, said each pixel;

selecting said edge pixels sequentially one edge pixel at a time and comparing the direction of said one edge pixel with the direction of another of said edge pixels at a specified distance from said one edge pixel to obtain a comparison result;

determining presence or absence of a defect in said contour from the comparison results obtained for said edge pixels; and obtaining an edge code $Ec(x,y)$ for each of said edge pixels as follows:

$Ec(x,y) = a\tan\{Ey(x,y)/Ex(x,y)\}$ if $Ex(x,y) > 0$ and $Ey(x,y) \geq 0$;

$Ec(x,y) = 360° + a\tan\{Ey(x,y)/Ex(x,y)\}$ if $Ex(x,y) > 0$ and $Ey(x,y) < 0$;

$Ec(x,y) = 180° + a\tan\{Ey(x,y)/Ex(x,y)\}$ if $Ex(x,y) > 0$;

$Ec(x,y) = 0°$ if $Ex(x,y) = 0$ and $Ey(x,y) > 0$; and $Ec(x,y) = 180°$ if $Ex(x,y) = 0$ and $Ey(x,y) < 0$;

where $(x,y)$ is the coordinate of said each edge pixel, and $Ex(x,y)$ and $Ey(x,y)$ are respectively the x-component and the y-component of the density gradient at position $(x,y)$; and wherein the step of comparing the direction comprises the step of comparing the edge code of said each edge pixel with the edge code of said another edge pixel.

2. The method of claim 1 further comprising the step of selecting said specified distance.

3. The method of claim 1 wherein the step of extracting edge pixels comprises the step of selecting one from a plurality of edge-extraction filters each with a mask of a different size.

4. An apparatus for inspecting a contour of a target object, said apparatus comprising:

image input means for obtaining a variable-density image of said target object;

edge extracting means for extracting edge pixels along and from said contour on said image;

measuring means for measuring directions of said edge pixels extracted by said edge extracting means, the direction of each of said edge pixels being defined as a direction that makes a specified angle with the direction of the density gradient on said variable-density image at, said each pixel;

comparing means for selecting said edge pixels sequentially one edge pixel at a time and comparing the direction of said one edge pixel with the direction of another of said edge pixels at a specified distance from said one edge pixel to obtain a comparison result; and judging means for determining presence or absence of a defect in said contour from the comparison results obtained by said comparing means;

wherein said comparing means serves to obtain an edge code Ec(x,y) for each of said edge pixels as follows:

$Ec(x,y) = a\tan\{Ey(x,y)/Ex(x,y)\}$ if $Ex(x,y)<0$ and $Ey(x,y) \geq 0$;

$Ec(x,y) = 360° + a\tan\{Ey(x,y)/Ex(x,y)\}$ if $Ex(x,y)>0$ and $Ey(x,y)<0$;

$Ec(x,y) = 180° = a\tan\{Ey(x,y)/Ex(x,y)\}$ if $Ex(x,y)<0$;

$Ec(x,y) = 0°$ if $Ex(x,y)=0$ and $Ey(x,y)>0$; and $Ec(x,y) = 180°$ if $Ex(x,y)=0$ and $Ey(x,y)<0$;

where (x,y) is the coordinate of said each edge pixel, and Ex(x,y) and Ey(x,y) are respectively the x-component and the y-component of the density gradient at position (x,y): and to compare the edge code of said each edge pixel with the edge code of said another edge pixel.

5. The apparatus of claim 4 wherein said measuring means measures an angle for each of said edge pixels, said angle indicating a perpendicular direction to the direction of density gradient at said each edge pixel.

6. The apparatus of claim 4 wherein said comparing means include distance setting means for setting said specified distance.

7. The apparatus of claim 4 wherein said edge extracting means extracts said edge pixels by using said selected edge-extraction filter.

8. The method of claim 1 wherein said specified angle is 90°.

9. The apparatus of claim 4 wherein said specified angle is 90°.

* * * * *